(12) United States Patent  
Kaminski

(10) Patent No.: US 8,931,770 B1
(45) Date of Patent: Jan. 13, 2015

(54) ADJUSTABLE ELECTRONIC DEVICE HOLDER

(75) Inventor: Brian J. Kaminski, Jackson, NJ (US)

(73) Assignee: Spirent Communications, Inc., Sunnyvale, CA (US)

( * ) Notice: Subject to any disclaimer, the term of this patent is extended or adjusted under 35 U.S.C. 154(b) by 127 days.

(21) Appl. No.: 13/431,715

(22) Filed: Mar. 27, 2012

Related U.S. Application Data

(60) Provisional application No. 61/470,024, filed on Mar. 31, 2011.

(51) Int. Cl.
*B25B 1/20* (2006.01)

(52) U.S. Cl.
USPC ............. 269/43; 269/902; 269/903; 269/266; 248/309.1; 248/346.07

(58) Field of Classification Search
CPC .................................... G01B 3/30; B23Q 1/25
USPC ........... 248/544, 316.1, 309.1, 917, 671, 127, 248/346.04, 346.06, 346.07, 346.01, 64, 248/67.5, 69, 72, 74.2, 74.5, 49, 108, 109, 248/689, 551, 85, 507, 508, 509, 73, 229.2, 248/62; 33/645, 549, 551, 573, 578; 361/679.01; 455/575.1, 90.3, 97; 439/529; 24/525, 569; 222/102; 379/428.01, 455

See application file for complete search history.

(56) References Cited

U.S. PATENT DOCUMENTS

| 5,064,321 | A | 11/1991 | Barnes |
| 5,300,881 | A | 4/1994 | Ferrer et al. |
| 5,505,438 | A | 4/1996 | Baldwin et al. |
| 5,615,258 | A * | 3/1997 | Ho ................................ 379/446 |
| 6,105,949 | A | 8/2000 | Morghen |
| 6,513,260 | B2 | 2/2003 | Krajec et al. |
| 6,698,560 | B2 * | 3/2004 | Reardon et al. ............. 191/12 R |
| 6,752,391 | B1 | 6/2004 | Euker |
| 6,929,255 | B2 | 8/2005 | Hwang |
| 7,755,378 | B2 | 7/2010 | Chang et al. |
| 2007/0207842 | A1 * | 9/2007 | Pemble et al. ............. 455/575.9 |

* cited by examiner

*Primary Examiner* — Kimberly Wood

(74) *Attorney, Agent, or Firm* — James F. Hann; Haynes Beffel & Beffel & Wolfeld

(57) ABSTRACT

An electronic device holder includes a base with at least three adjustable-position retaining posts extending upwardly from the base to permit an electronic device to be secured at a position above the base by the retaining posts. A test lead restraint assembly may be used to capture and thereby stabilize a test lead extending from the electronic device during testing of the electronic device.

22 Claims, 5 Drawing Sheets

ADJUSTABLE ELECTRONIC DEVICE HOLDER

CROSS-REFERENCE TO OTHER APPLICATIONS

This application claims the benefit of U.S. provisional patent application No. 61/470,024, filed 31 Mar. 2011, and entitled "Adjustable Electronic Device Holder."

BACKGROUND OF THE INVENTION

Electronic devices, such as cell phones, are typically subject to a great deal of testing, especially during their prototype stages. Because manufacturers make only a few prototypes for testing, these prototypes are expensive pieces of equipment and are quite valuable to the designers. During testing cables are often connected to the device, typically through connectors mounted to the device. The connectors may be an integral part of the device or added on to provide the desired electronic access to the device components. The connectors often include small RF connectors which are often not robust in their design and may tend to break off easily, possibly with damage to the device.

BRIEF SUMMARY OF THE INVENTION

An example of an electronic device holder is used during testing of an electronic device of the type having a test lead extending therefrom. The electronic device holder includes a base having upper and lower surfaces and at least three retaining post assemblies mounted to the base. Each retaining post assembly includes a positioner and a retaining post mounted to and extending from the positioner. The positioners are movably mounted to the base for movement of the retaining posts along paths over the upper surface of the base so to vary the distances between the retaining posts to permit an electronic device to be captured between the retaining posts. Other examples of an electronic device holder may also include one or more the following. The retaining posts may have cushioned outer surfaces. The positioners may be mountable to the base at different positions. The retaining posts may define a device capture region above the upper surface and a support member may be mounted to the base within the device capture region so that the electronic device can be at least partially vertically supported by the support member. A test lead restraint assembly may be associated with, typically mounted to, the base. The test lead restraint assembly may include first and second restraint elements used to capture and thereby stabilize the test lead.

An example of a method for stabilizing an electronic device during testing, the electronic device having at least one test lead extending therefrom, is carried out as follows. An electronic device is positioned spaced apart above the base of an electronic device holder and between a plurality of restraining posts extending upwardly from the base. The restraining posts are biased towards device-supporting positions and against the electronic device. The restraining posts are fixed in the device-supporting positions thereby securing the electronic device in a testing position spaced apart above the base. A test lead extending from the electronic device is stabilized. Other examples of the electronic device stabilizing method may include one or more the following. The stabilizing step may comprise capturing the test lead between upper and lower test lead restraining elements using a test lead restraining assembly located at a fixed position relative to the base. The positioning step may be carried out using restraining posts having cushioned outer surfaces. The electronic device may be vertically supported using a support member extending upwardly from the base at a position spaced apart from each of the restraining posts.

Other features, aspects and advantages of the present invention can be seen on review the figures, the detailed description, and the claims which follow.

DETAILED DESCRIPTION OF THE INVENTION

Figure 1:
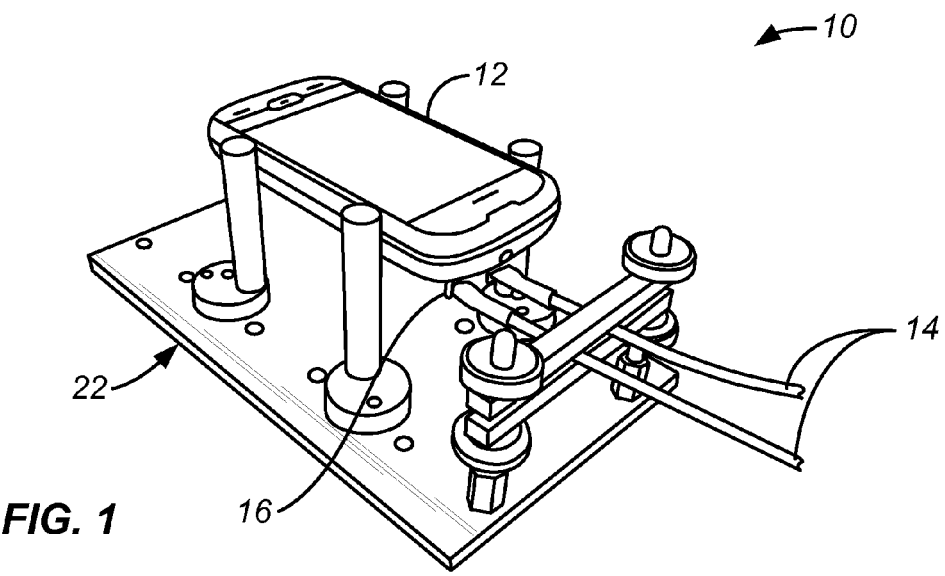
FIG. 1 is a top perspective view of an electronic device holder shown supporting an electronic device and testing leads.

The present invention is based in part upon the recognition that it is important that undue stress not be applied to the connectors mounted to electronic devices during testing of the electronic devices. The present invention helps to ensure that the device is held in a stable position with good access to the device without damage to the device during testing.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

Figure 2:
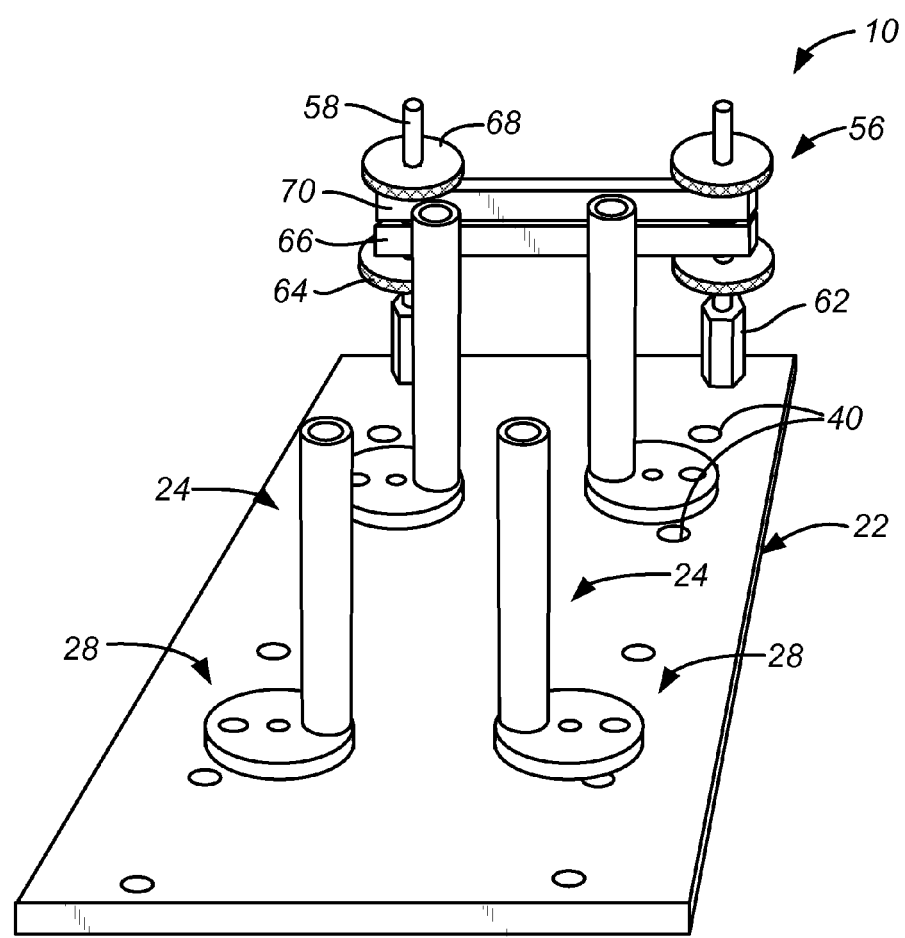
FIG. 2 is an overall view of the electronic device holder of FIG. 1 without the electronic device or testing leads and with the positioners at different orientations from their orientations of FIG. 1.
Figure 3:
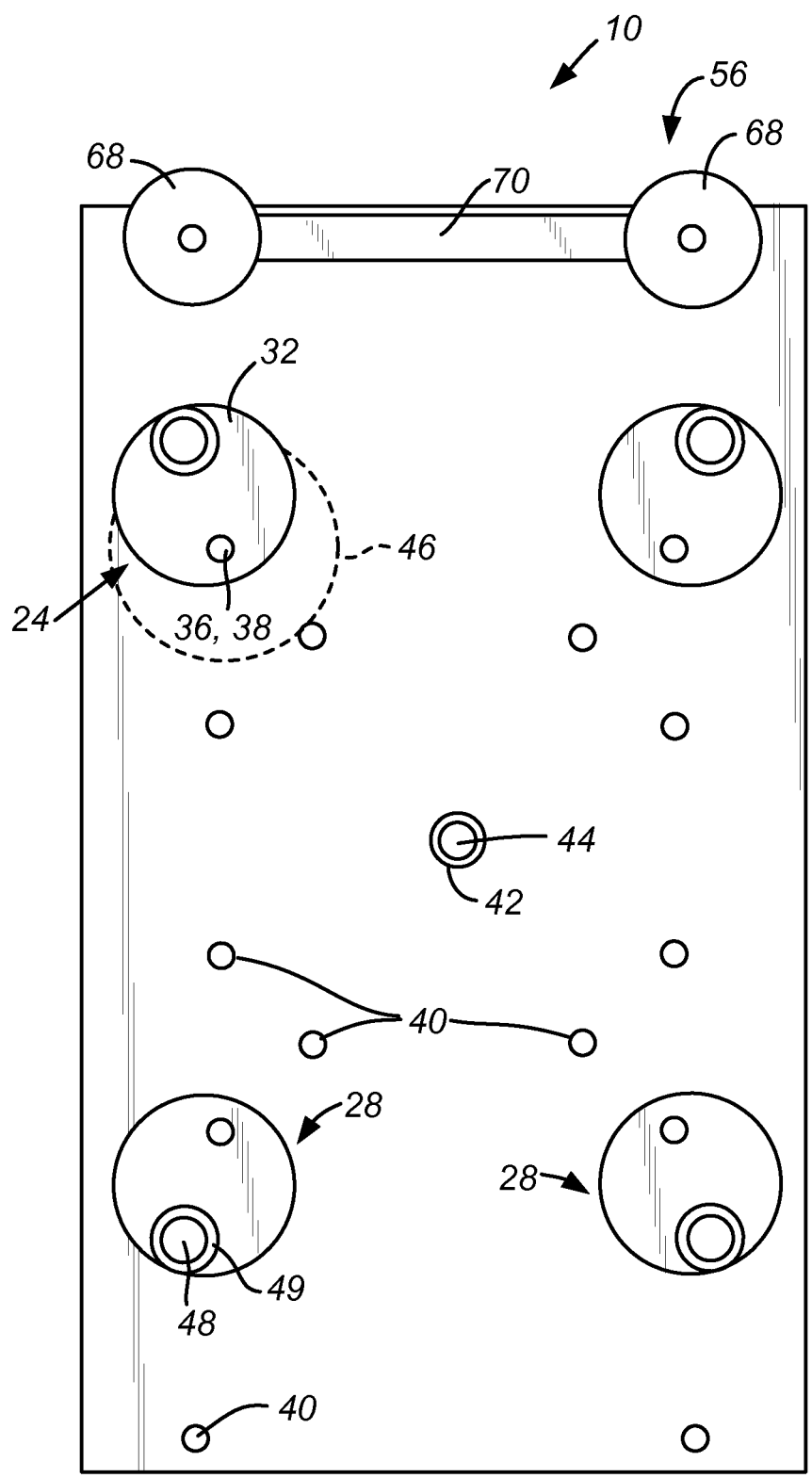
FIG. 3 is a top plan view of the electronic device holder of FIG. 1 without the electronic device or testing leads.
Figure 4:
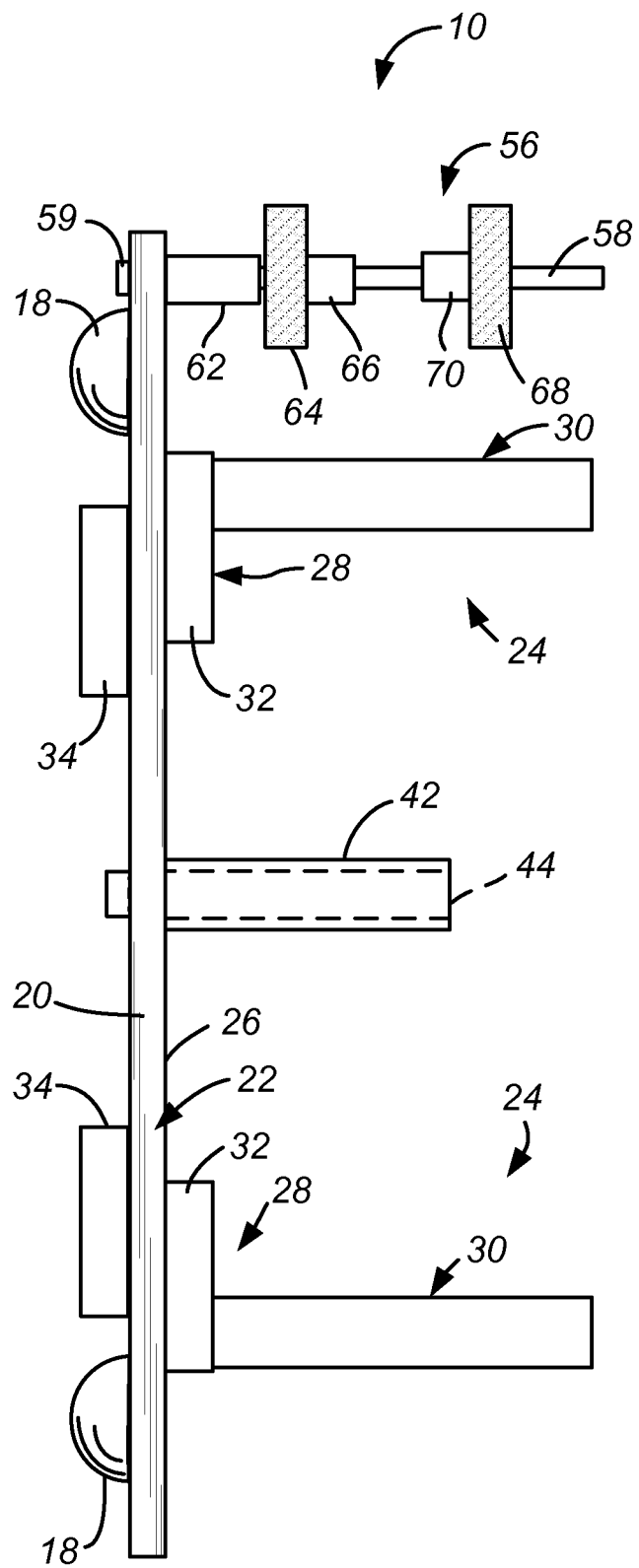
FIG. 4 is a side elevation view of the electronic device holder of FIG. 3.

FIG. 1 is a top perspective view of an electronic device test stand or holder 10 shown supporting an electronic device 12 having test leads 14, also called testing leads 14, extending from connectors 16. FIG. 2 is an overall view of the electronic device holder of FIG. 1 without the electronic device 12 or test leads 14 and with the positioners 24, described below, at different orientations from their orientations of FIG. 1. Base 22 is typically made of aluminum or stainless steel, but could also be made of, for example, an appropriate polymer material.

Referring now also to FIGS. 3-6, holder 10 is shown with four retaining post assemblies 24 extending from the upper surface 26 of base 22. Each retaining post assembly 24 includes a positioner 28 and a retaining post 30. Positioner 28 includes a disk shaped cam member 32 secured to the base 22 by a T-type cam lock 34. The threaded post 38 of cam lock 34 passes through an eccentrically positioned threaded opening 36 in cam member 32. Threaded post 38 passes through any of several different through-holes 40 in base 22 according to the size and shape of the electronic device 12. While four retaining post assemblies 24 are illustrated in the figures, a greater or lesser number may also be used depending primarily on the shape of electronic device 12.

Test stand 10 also includes, in some examples, a support member 42 centrally located on base 22. Support member 42 has a support surface 44 used to provide vertical support to electronic device 12. The movement of positioners 28 about a vertical axis passing through through-holes 40 causes retaining post 30 to move along a circular path 46. Each retaining post 30 includes a stiff elongate body 48, typically of steel or aluminum, covered by a cushioning material 49, such as a layer of silicone about 1-2 mm thick. Elongate body 48 is press fitted into an appropriate opening formed in cam member 32. The use of the cushioning material 49 helps ensure the electronic device 12 is securely positioned without damage to the electronic device. Elongate body 48 is illustrated as a cylindrical body but elongate body having other cross-sectional shape may also be used. In addition, although cushioning material 49 is illustrated as having a constant thickness, it could have a variable thickness whether or not elongate body 48 is cylindrical. In either event the surface area of cushioning material 49 contacting electronic device 12 can be adjusted according to the particular electronic device being supported. More than one support member 42 may be used. Support surface 44 may be configured to have an enlarged support surface area for electronic device 12. In addition, when multiple support members 42 are used, support surface 44 may be configured to extend between two or more of the support members.

Figure 5:
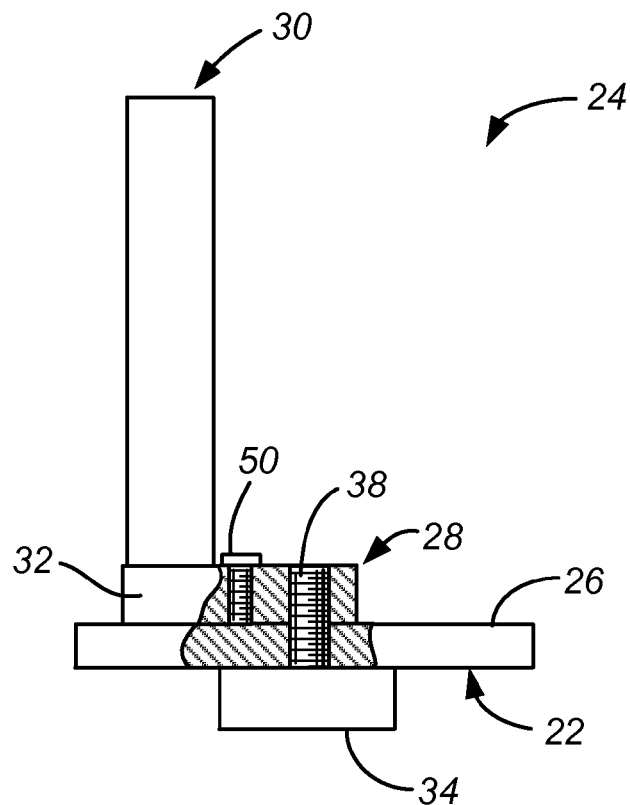
FIG. 5 is a partial side cross-sectional view showing a slightly modified version of the positioner which includes a post locking screw to temporarily hold the cam member in position.
Figure 6:
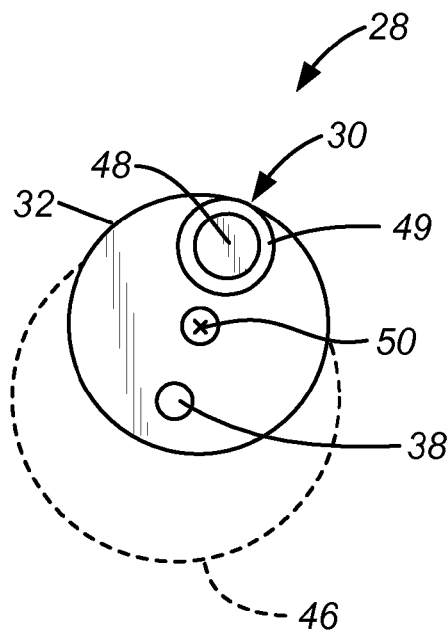
FIG. 6 is a simplified top view of the positioner of FIG. 5.
Figure 7:
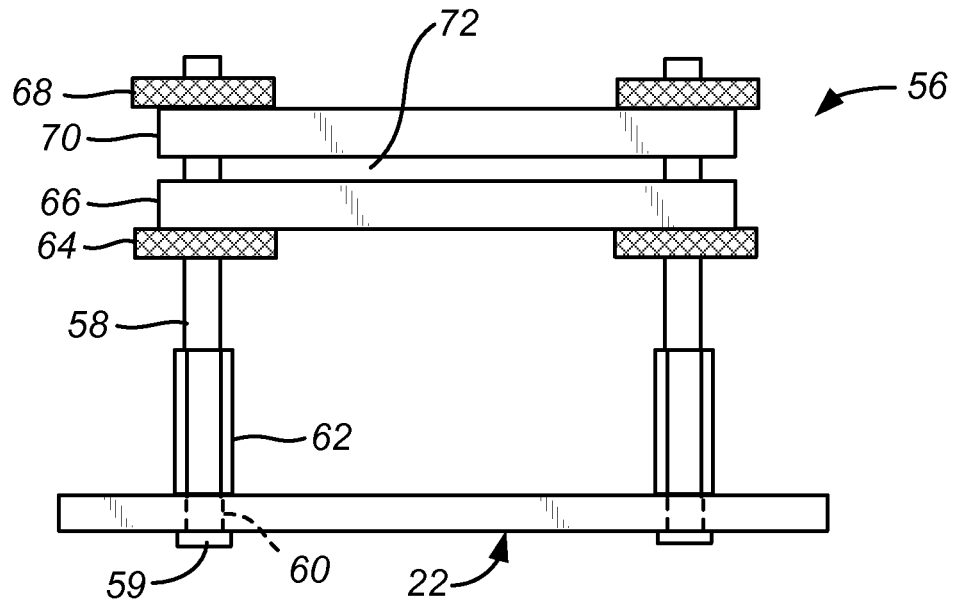
FIG. 7 is a simplified end view of a portion of the structure of FIGS. 3 and 4 showing the test lead restraint assembly.
Figure 8:
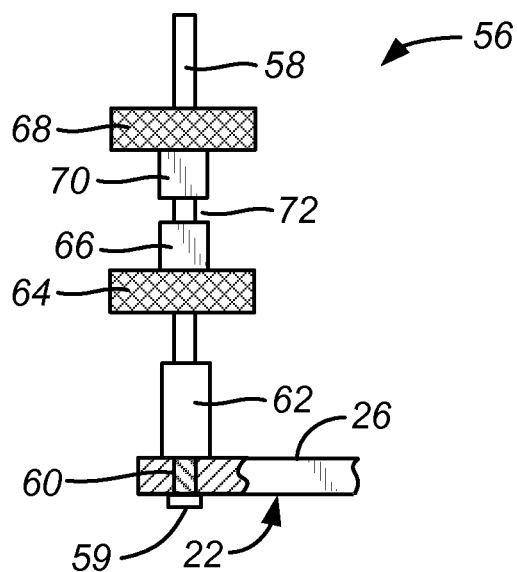
FIG. 8 is a partial side cross-sectional view of the structure of FIG. 7.

When the retaining post 30 is at a desired position, cam lock 34 is tightened thus securing the retaining post at the desired position along path 46. This is repeated for each retaining post 30. If desired, as shown in the example of FIGS. 5 and 6, a post locking screw 50 can be used to semi-permanently secure cam member 32 at a desired position relative to base 22. Although path 46 is, in this example, a circular path, path 46 may have other shapes, including paths having non-circular curved and straight path segments.

Referring now primarily to FIGS. 3, 4, 7 and 8, a cable restraint assembly 56, sometimes called a test lead restraint assembly, will be discussed. Assembly 56 includes a pair of spaced apart threaded posts 58 extending through holes 60 in base 22 along one edge of the base. Each post 58 has an enlarged head 59 and is maintained in position through the use of a threaded sleeve 62 also mounted to threaded posts 58 with base 22 captured between threaded sleeve 62 and enlarged head 59. Support elements 64 are shown in the form of threaded thumb nuts. Support elements 64 can be positioned vertically along threaded posts 58. A first, or lower, restraint bar 66 has holes at either end through which posts 58 pass. Accordingly, lower restraint bar 66 is supported at the desired height above upper surface 26 on base 22 by the positions of support elements 64.

Assembly 56 also includes restraint bar biasing elements 68 in the form of threaded thumb nuts in this example. Upper restraint bar 70, typically similar to or identical to restraint bar 66, is mounted on posts 58 between biasing elements 68 and lower restraint bar 66 creating a test lead region 72 therebetween. Lower and upper restraint bars 66, 70 are typically made of a rigid or semi-rigid material. Lower and upper restraint bars 66, 70 are could also be covered with a material to enhance friction with, and/or to supply cushioning to, testing leads 14. While the disclosed example shows cable restraint assembly 56 secured to base 22 at a fixed position, it could be at different positions on base 22 and, if desired, could be mounted to, for example, a separate base so that it would be associated with, typically by being adjacent to, base 22. It is preferred that cable restraint assembly 56 be at a fixed position relative to base 22 whether or not is secured directly to the base to help reduce forces exerted on connectors 16 by testing leads 14 during testing. In this example, connectors 16 are configured so that testing leads 14 extend horizontally from connectors 16. The distance between connectors 16 and upper surface 26 of the base 22 is substantially the same as the distance between testing leads 14, secured between lower and upper restraining bar 66 and 70 at the test lead region 72, and the base 22. In this way testing leads 14 are supported by this base restraining assembly 56 so that they come horizontally straight out of connectors 16 to help minimize stresses on the connectors. If connectors 16 were not configured to direct test lead 14 horizontally relative to base 22, the height of test lead region 72 would be adjusted to accommodate the direction of test leads 14.

One advantage of the cable restraint assembly 56 is that it provides an adjustable method of restraining test leads 14 that does not require tools. Upper and lower thumb nut sets, acting as support elements 64 and biasing elements 68, along with restraint bars 66, 70, acting as two pinch bars sandwiched between elements 64, 68, allow for an adjustable height along with an adjustable compression pressure technique to be attained for test lead restraint. The height adjustability allows different test lead types and or dimensions to be secured without tools. This test lead restraint also allows quick toolless securing with good adjustability.

Another advantage of holder 10 relates to the cam style retaining post assemblies 24. These retaining post assemblies are easily adjustable. Posts 30 can be relocated to different locations on base 22 to increase the number of different sized and different shaped devices that can be secured. Tee type locking nuts 34 allow posts 30 to be locked into a position without the use of tools to secure the device once the cam is positioned into the chosen ideal location. The use of silicone, or other cushioning material 49 on the posts, provides a frictional, non-damaging method to hold the device 12 in position. The compression of the silicone gives post 30 the holding ability for the device without damaging the surface of the device.

In use, the positions of retaining post assemblies 24 can be changed, if necessary, using the different positions of through holes 40 passing through base 22 based upon size and shape of electronic device 12 to be tested. If desired, a suitable support member 42 can be used to help support the electronic device 12. Biasing elements 68 of the test lead restraint assembly 56 can be removed to allow upper restraining bar 70 to be removed from threaded posts 58. Electronic device 12, typically with testing leads 14 extending from connectors 16, is then positioned between the properly positioned retaining posts 30. One or more of the retaining posts 30, typically two or more, are then moved along circular paths 46 as cam members 32 pivot about threaded posts 38. Once in the proper position, typically engaging the edges of electronic device 12, the retaining posts 30 are secured in their device-supporting positions using cam locks 34 which secure cam members 32 to upper surface 26 of base 22. Doing so secures the electronic device 12 in a testing position above base 22. Testing leads 14 are then stabilized by placing upper restraint bar 70 back onto threaded posts 58 to rest against the testing leads. Test lead restraining assembly 56 is in a fixed position relative to base 22 to help reduce forces being exerted on connectors 16 by testing leads 14 during testing. In this example, assembly 56 is mounted directly to the base 22. Biasing elements 68 are then threaded onto threaded posts 58 biasing upper restraint bar 70 against testing leads 14 thus capturing the testing leads between lower and upper restraint bars 66 and 70 within test lead region 72. In some examples, electronic device 12 may be mounted to electronic device holder 10 before testing leads 14 are connected thereto. In such situation, after electronic device 12 has been secured to electronic device holder 10, the testing leads 14 may be, for example, threaded between lower and upper restraining bar 66, 70 and then connected to electronic device 12 using connectors 16. After such connection, biasing elements 68 can be used to secure the testing leads 14 between lower and upper restraining bars 66, 70.

The above descriptions may have used terms such as above, below, top, bottom, over, under, et cetera. These terms may be used in the description and claims to aid understanding of the invention and not used in a limiting sense.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims.

Any and all patents, patent applications and printed publications referred to above are incorporated by reference.

What is claimed is:

1. An electronic device holder, for use during testing of an electronic device of the type having a test lead extending therefrom, comprising:
   a base having upper and lower surfaces;
   at least three retaining post assemblies mounted to the base, each retaining post assembly comprising a positioner and a retaining post mounted to and extending from the positioner;
   the positioners movably mounted to the base for movement of the retaining posts along paths over the upper surface of the base so to vary the distances between the retaining posts to permit an electronic device to be captured between the retaining posts; and
   an electronic device test lead restraint assembly associated with the base, the test lead restraint assembly usable to restrain test leads extending from the electronic device, the test lead restraint assembly comprising:
   first and second test lead restraint elements;
   a restraint elements support supporting the restraint elements at chosen positions relative to the retaining posts; and
   a restraint element biasing assembly biasing the restraint elements towards one another so to permit a test lead extending from an electronic device to be captured therebetween thus stabilizing the test lead.

2. The holder according to claim 1, wherein the retaining posts are cylindrical.

3. The holder according to claim 1, wherein the retaining posts have cushioned outer surfaces.

4. The holder according to claim 1, wherein the retaining posts comprise a stiff elongate body covered by a cushioning material.

5. The holder according to claim 1, wherein the paths are circular paths.

6. The holder according to claim 1, wherein the positioners are mountable to the base at different positions.

7. The holder according to claim 1, wherein the retaining posts define a device capture region spaced apart from and above the upper surface.

8. The holder according to claim 7, further comprising a support member mounted to the base within the device capture region and extending above the upper surface of the base, the support member having an upper support surface spaced apart from and above the upper surface of the base, whereby the electronic device can be at least partially vertically supported by the upper support surface of the support member at a position spaced apart from the upper surface of the base.

9. The holder according to claim 1, wherein the positioners comprise manually actuated locking elements to permit a user to manually secure the retaining post at a desired position along the path.

10. The holder according to claim 1, wherein the test lead restraint assembly is mounted directly to the base.

11. The holder according to claim 1, wherein the first and second restraint elements are at a position spaced apart above the upper surface of the base.

12. The holder according to claim 1, wherein the restraint elements support comprises first and second posts with first and second support elements at chosen locations along the posts, the support elements configured to support the restraint elements.

13. The holder according to claim 12, wherein the support elements are adjustably mounted to the posts so that the chosen locations are variable position chosen locations.

14. The holder according to claim 1, wherein the restraint element biasing assembly comprises biasing elements adjustably mounted to the posts.

15. The holder according to claim 14, wherein the first and second posts are threaded posts and at the biasing elements comprise manually operated threaded nuts.

16. The holder according to claim 15, wherein each of the restraint bars has first and second openings through which the posts pass.

17. A method for stabilizing electronic device during testing, the electronic device having a test lead extending therefrom, comprising: positioning an electronic device spaced apart above the base of an electronic device holder and between a plurality of restraining posts extending upwardly from the base;
   biasing the restraining posts towards device-supporting positions and against the electronic device;
   fixing the restraining posts in the device-supporting positions thereby securing the electronic device in a testing position spaced apart above the base; and
   stabilizing a test lead extending from the electronic device, the test lead stabilizing step comprising capturing the test lead between first and second test lead restraining elements using a test lead restraining assembly located at a fixed position relative to the base.

18. The method according to claim 17, wherein the stabilizing step is carried out using a test lead restraining assembly secured directly to the base.

19. The method according to claim 17, wherein the positioning step is carried out using restraining posts having cushioned outer surfaces.

20. The method according to claim 17, further comprising vertically supporting the electronic device using a support member extending upwardly from the base at a position spaced apart from each of the restraining posts.

21. A method for stabilizing electronic device during testing, the electronic device having a test lead extending therefrom, comprising: positioning an electronic device spaced apart above the base of an electronic device holder and between a plurality of restraining posts extending upwardly from the base;

biasing the restraining posts towards device-supporting positions and against the electronic device;

fixing the restraining posts in the device-supporting positions thereby securing the electronic device in a testing position spaced apart above the base;

stabilizing a test lead extending from connectors at the electronic device, wherein the positioning step positions the connectors at a first distance above the base; and wherein the stabilizing step comprises capturing the test lead at a second distance above the base, the second distance being substantially the same as the first distance.

22. A method for stabilizing electronic device during testing, the electronic device having a test lead extending therefrom, comprising: Positioning an electronic device spaced apart above the base of an electronic device holder and between a plurality of restraining posts extending upwardly from the base;

biasing the restraining posts towards device-supporting positions and against the electronic device;

fixing the restraining posts in the device-supporting positions thereby securing the electronic device in a testing position spaced apart above the base; and stabilizing a test lead extending from the electronic device, the stabilizing step comprising stabilizing a plurality of test leads extending from the electronic device.

\* \* \* \* \*